United States Patent Office 3,345,262
Patented Oct. 3, 1967

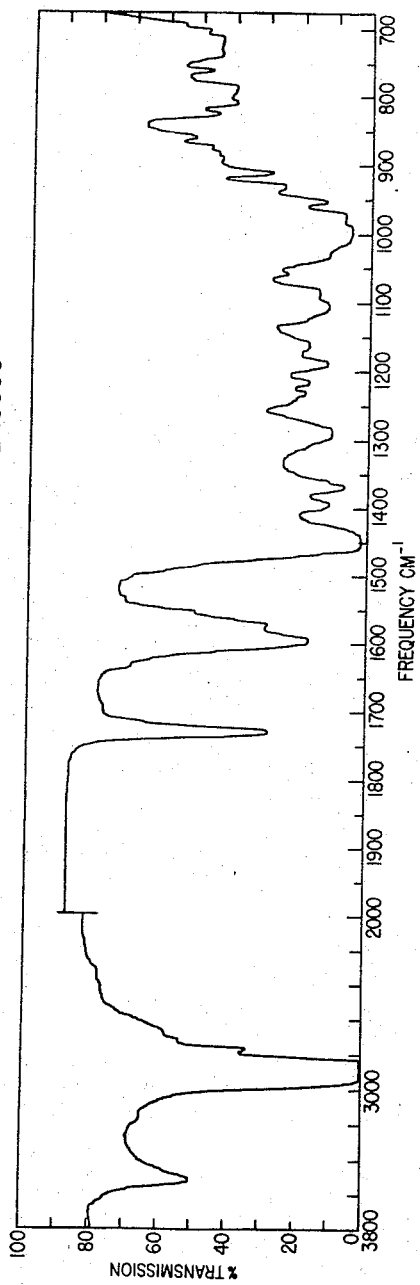

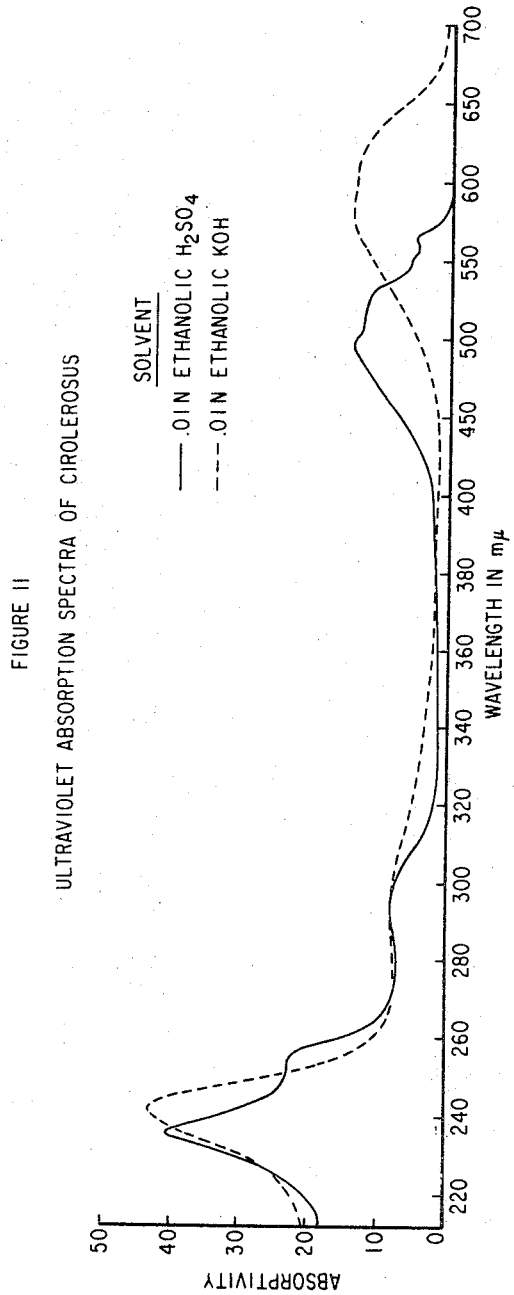
FIGURE II
ULTRAVIOLET ABSORPTION SPECTRA OF CIROLEROSUS

3,345,262
ANTIBIOTIC CIROLEROSUS AND PROCESS FOR PRODUCING THE SAME
Curtis E. Meyer, Charleston Township, Kalamazoo County, and Bijoy K. Bhuyan, Kalamazoo, Mich., assignors to The Upjohn Company, Kalamazoo, Mich., a corporation of Delaware
Filed Mar. 16, 1964, Ser. No. 352,257
10 Claims. (Cl. 167—65)

ABSTRACT OF THE DISCLOSURE

New antibiotic cirolerosus and a microbiological process for the production thereof. Cirolerosus can be used to inhibit the growth of various bacteria, for example, Bacillus subtilis, Staphylococcus albus, and Streptococcus lactis.

---

This invention relates to a novel composition of matter and to process for the production thereof. More particularly, this invention relates to a new compound, cirolerosus (U–12241), and to a process for the production thereof.

Cirolerosus is a biosynthetic product obtained by culturing a cirolerosus-producing actinomycete in an aqueous nutrient medium. It is a basic substance which has the property of adversely affecting the growth of certain organisms, particularly bacteria, for example, *Bacillus subtilis, Bacillus cereus, Staphylococcus aureus, Sarcina lutea, Klebsiella pneumoniae, Lactobacillus casei, Escherichia coli*, and *Mycobacterium avium*, and can be used alone or in combination with other antibacterial agents to prevent the growth of, or reduce the number of, such organisms present in various environments. For example, it is useful for controlling the infection of silkworms caused by pathogenic cultures of *B. subtilis;* it is also useful as an oil preservative, for example, as a bacteriostatic agent for inhibiting the growth of certain microorganisms that cause spoilage in cutting oils. Cirolerosus can be used either as the free base or as an acid addition salt, alone or in combination with other antibacterial agents, to prevent the growth of or to reduce the number of microorganisms present in various environments, for example, in plants and in animals such as mammals, birds, fish, and reptiles, where the infecting microorganism is susceptible to the antibiotic. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement to promote the growth of animals, for example, mammals, birds, fish, and reptiles.

THE MICROORGANISM

The actinomycete used according to this invention for the production of cirolerosus has been designated as *Streptomyces bellus* var. *cirolerosus*. A culture of the living organism can be obtained from the permanent collection of the Northern Utilization and Research Division, Agricultural Research Service, U.S. Department of Agriculture, Peoria, Ill., U.S.A. Its accession number in this repository is NRRL 3107.

*Streptomyces bellus* var. *cirolerosus*, NRRL 3107, is very closely related to *S. bellus*. Both organisms are characterized by predominately blue aerial growth and a red reverse. They are melanin positive, and warty to spiny spores are produced in spiral sporophores. Both organisms produce coremia. Despite these similarities, it is readily apparent from the following tables that these organisms are different, hence the adoption of the name *S. bellus* var. *cirolerosus* var. nova.

Following is a macroscopic and microscopic characterization of both *S. bellus* and *S. bellus* var. *cirolerosus* var. nova.

APPEARANCE OF *STREPTOMYCES BELLUS* VAR. *CIROLEROSUS* AND *STREPTOMYCES BELLUS* ON EKTACHROME [1]

| Agar Medium | Cultures | | | |
|---|---|---|---|---|
| | *S. bellus* var. *cirolerosus* | | *S. bellus* | |
| | Surface | Reverse | Surface | Reverse |
| Bennett's | Blue | Red-tan | Blue | Red-tan. |
| Czapek's Sucrose | Blue-pink | Red | do | Orange to Red. |
| Maltose Tryptone | Blue | Brown | do | Brown. |
| Peptone Iron | Brown | do | Brown | Do. |
| 0.1% Tyrosine | Blue | Red-tan | Blue | Red-tan. |
| Casein Starch | do | Yellow-tan. | do | Yellow-tan. |

[1] Dietz, A., Ektachrome Transparencies as Aids in Actinomycete Classification, Annals of the N.Y. Academy of Science 60: 152–154, 1954.

UTILIZATION OF CARBON COMPOUNDS BY *STREPTOMYCES BELLUS* VAR. *CIROLEROSUS* AND *STREPTOMYCES BELLUS* IN SYNTHETIC MEDIUM [1]

| | *S. bellus* var. *cirolerosus* | *S. bellus* |
|---|---|---|
| Control | (−) | (−) |
| 1. D-xylose | + | + |
| 2. L-arabinose | + | + |
| 3. Rhamnose | + | + |
| 4. D-fructose | + | + |
| 5. D-galactose | + | + |
| 6. D-glucose | + | + |
| 7. D-mannose | + | + |
| 8. Maltose | + | + |
| 9. Sucrose | + | + |
| 10. Lactose | + | + |
| 11. Cellobiose | + | + |
| 12. Raffinose | + | + |
| 13. Dextrin | + | + |
| 14. Inulin | + | (−) |
| 15. Soluble Starch | + | + |
| 16. Glycerol | + | + |
| 17. Dulcitol | (+) | (−) |
| 18. D-mannitol | + | + |
| 19. D-sorbitol | (+) | + |
| 20. Inositol | + | + |
| 21. Salicin | + | + |
| 22. Phenol | (−) | − |
| 23. Cresol | − | − |
| 24. Na Formate | − | − |
| 25. Na Oxalate | (−) | − |
| 26. Na Tartrate | (−) | (−) |
| 27. Na Salicylate | + | (+) |
| 28. Na Acetate | − | − |
| 29. Na Citrate | + | (+) |
| 30. Na Succinate | + | (+) |

[1] Pridham, T. G. and Gottlieb, D., "Assimilation of Carbon Compounds in Synethic Medium," J. Bact. 56. 107–114. 1948.
+ Positive Utilization.
− Negative Utilization.
(−) Slight Growth—No Utilization.
(+) Positive Utilization—Only Slight Growth.

CULTURAL CHARACTERISTICS OF *STREPTOMYCES BELLUS* VAR. *CIROLEROSUS* AND *STREPTOMYCES BELLUS*

| Medium | *S. bellus* var. *cirolerosus* | *S. bellus* |
|---|---|---|
| Peptone-Iron Agar. | Gray-white aerial growth. Brown vegetative growth. Melanin positive. | Trace gray aerial growth. Brown vegetative growth. Melanin positive. |
| Calcium Malate Agar. | Blue-white aerial growth. Pale lavender reverse. No pigment. Malate solubilized. | White aerial growth with trace of blue. Pale lavender-white reverse. No pigment. Malate solubilized. |

CULTURAL CHARACTERISTICS OF STREPTOMYCES BELLUS VAR. CIROLEROSUS AND STREPTOMYCES BELLUS—Continued

| Medium | S. bellus var. cirolerosus | S. bellus |
|---|---|---|
| Glucose Asparagine Agar. | Pink aerial growth. Salmon reverse. Very slight trace salmon pigment. | Peach-white aerial growth. Orange Reverse. Pale peach pigment. |
| Xanthine Agar. | Gray pink aerial growth. Pink tan reverse. Pink tan pigment. Xanthine solubilized. | No aerial growth. Peach vegetative growth. Peach pigment. Xanthine solubilized. |
| Casein Starch Agar. | Blue gray aerial growth. Yellow reverse. Trace yellow pigment. Starch hydrolyzed. | Blue aerial growth. Yellow reverse. Trace yellow pigment. Starch hydrolyzed. |
| Tyroxine Agar. | Gray pink aerial growth. Brown reverse. Brown pigment. Tyrosine solubilized. | Lavender pink aerial growth. Pink-tan-brown reverse. Pink-tan-brown pigment. Tyrosine solubilized. |
| Tomato Paste-Oatmeal Agar. | Gray-pink aerial growth. Rose reverse. No pigment. | Trace pink aerial growth. Peach reverse. Trace peach pigment. |
| Bennett's Agar. | Lavender-gray aerial growth. Red tan reverse. Tan pigment. | Blue aerial growth with trace of pink. Rose-tan reverse. Pale tan pigment. |
| Czapek's Sucrose Agar. | Lavender-rose aerial growth. Purple reverse. Trace purple pigment. | Pink aerial growth. Rose reverse. No pigment. |
| Maltose Tryptone Agar. | Pink aerial growth. Red-tan reverse. Trace tan pigment. | Blue-pink aerial growth. Rose-tan reverse. Pale tan pigment. |
| Plain Gelatin. | Tan brown pigment in ¼ of medium. Liquefied in pigment area. | Brown pigment at surface. Tan pigment in ⅔ of medium. Trace liquefaction. |
| Nutrient Gelatin. | Tan brown pigment in ¼ of medium. Liquefied in pigment area. | Trace tan pigment. No liquefaction. |
| Synthetic Nitrate Broth. | Surface pellicle. Pink tan pigment. Reduction. | Very slight trace bottom growth. No reduction. |
| Nutrient Nitrate Broth. | Surface pellicle. Tan pigment. No reduction. | Trace surface growth. Flocculent at base. Yellow tan pigment. No reduction. |
| Litmus Milk. | Surface ring and pellicle. Litmus reduced slightly. No peptonization. pH 6.2. | Surface ring. No peptonization. pH 6.1. |

COLOR COMPARISON OF S. BELLUS VAR. CIROLEROSUS AND S. BELLUS (COLORS ACCORDING TO "THE ISCC-NBS METHOD OF DESIGNATING COLORS AND A DICTIONARY OF COLOR NAMES," NBS CIRCULAR 553, 1955)

| Agar Medium | S. bellus var. cirolerosus | | S. bellus | |
|---|---|---|---|---|
| | Surface | Reverse | Surface | Reverse |
| Bennett's. | Grayish red. | Dark red. | Grayish yellow. | Grayish. |
| Czapek's Sucrose. | Pale purple. | Grayish reddish purple. | Pale orange yellow. | Light yellowish pink. |
| Maltos Tryptone. | Light reddish brown. | Moderate reddish brown. | Light yellowish brown. | Light yellowish. |

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn-steep liquor, yeast, autolyzed Brewer's yeast with milk solids, soybean meal, cotton seed meal, corn meal, milk solids, pancreatic digest of casein, distiller's solubles, animal peptone liquors, meat and bone scraps, and the like. A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to saisfactory growth of the microorganism, for example, between about 18° and 40° C. and preferably between about 26° and 30° C. Ordinarily, optimum production of the compound is obtained in about 2 to 10 days. The medium normally stays fairly close to neutral, or on the acid side during the fermentation. The final pH is dependent, in part, on the buffers present, if any, and in part on the initial pH of the culture medium which is advantageously adjusted to about pH 6-8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of equipment. Accordingly, it is desirable to produce a vegetative inoculum in a nutrient broth culture by inoculating the broth culture with an aliquote from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a basic compound having the empirical formula $C_{45-52}H_{62-76}N_2O_{18}$. It is a red solid and can serve as an indicator in that it is red in acid solution and blue in alkaline solution. It is soluble in lower-alkanols, e.g., methanol, ethanol, and the like; lower-alkyl esters of lower alkanoic acids, e.g., ethyl acetate, and the like; halogenated lower-alkanes, e.g., methylene chloride, chloroform, ethylene dichloride, and the like; inorganic and organic acids, benzene and glycols. It is slightly soluble in ether and relatively insoluble in paraffin hydrocarbons.

A variety of procedures can be employed in the isolation and purification of cirolerosus, for example, solvent extraction, liquid-liquid distribution in a Craig apparatus, and the use of adsorbents.

Solvent extraction procedures are preferred for commercial production inasmuch as they are less time consuming and less expensive, and higher recovery yields are obtained thereby.

In a preferred recovery process, the mycelium and undissolved solids are first separated from the fermentation beer by conventional means such as filtration with the use of a filter aid (or by centrifugation). The filtered beer (or centrifuged beer) is adjusted to a pH of about 8.5 and extracted with methylene chloride. The methylene chloride extract is concentrated and the concentrate is extracted with aqueous acid at a pH of about 3.5. The acid extract is adjusted to a pH of about 5.6 with alkali and extracted with methylene chloride. Concentration of the methylene chloride extract and addition of Skellysolve B (isomeric hexanes) to the concentrate precipitates cirolerosus as a red solid which is further purified by counter-current distribution in a system composed of equal parts of toluene, methylene chloride and propylene glycol. If desired, the solvent phase can be acidified, and the new compound recovered in a protonated form.

The new compound of the invention can also be recovered from the filtered beer by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd ed. (1958), John Wiley and Sons, Inc. Carboxylic acid cation exchange resins of this type are marketed under the trade names Amberlite IRC-50 and Zeokarb 226. Suitable sulfonic acid resins include nuclear sulfonated polystyrene resins cross-linked with divinylbenzene which are obtained by the procedure given on page 84 of Kunin, supra. Sulfonated cation exchange resins of this type are marketed under the tradenames Dowex–50, Amberlite IR–120, Nalcite HCR, Chempro C–20, Permutit Q, and Zeokarb 225.

The antibiotic is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin, and the antibiotic is extracted with a water-immiscible solvent according to the process described above. [Suitable anion exchange resins for this purpose are obtained by chloromethylating by the procedure given on pages 88 and 97 of Kunin, supra, polystyrene cross-linked, if desired, with divinylbenzene prepared by the procedure given on page 84 of Kunin, supra, and quaternizing with trimethylamine or dimethylethanolamine by the procedure given on page 97 of Kunin, supra. Anion exchange resins of this type are marketed under the tradenames Dowex 2, Dowex 20, Amberlite IRA–400, Duolite A–102 and Permutit S–1.]

The novel compound of the invention can also be recovered from harvest beers and other aqueous solutions by adsorption on a surface active adsorbent, for example, Florisil (a synthetic silicate of the type described in U.S. Patent 2,393,625 and sold by the Floridin Company), decolorizing carbon, or decolorizing resins, and eluting the adsorbed material with a solvent. Any of the solvents mentioned above can be used. A suitable decolorizing resin is Permutit DR (U.S. Patent 2,702,263).

The new compound of the invention can be purified by successive transfers from protonated to non-protonated forms and vice versa, especially with other types of treatments intervening as for example, solvent extractions and washings, chromatography, and fractional liquid-liquid extraction. In this manner salts of cirolerosus can be employed to isolate or upgrade the antibiotic. For example, the antibiotic can be converted to an insoluble salt, such as the picrate, which can be subjected to purification procedures and then used to regenerate the antibiotic free base by treatment with alkali. Or the antibiotic can be converted to a water-soluble salt, such as the hydrochloride or sulfate, and the aqueous solution of the salt extracted with various water-immiscible solvents before regenerating the antibiotic free base by treatment with alkali of the thus-extracted acid solution.

Salts of cirolerosus can be used for the same biological purposes as the free base or they can be employed to upgrade the antibiotic as previously described.

Specific acid salts can be made by neutralizing the free base with the appropriate acid to below about pH 7.5, and advantageously to about pH 2 to pH 6. Suitable acids, for this purpose include hydrochloric, sulfuric, phosphoric, acetic, succinic, citric, lactic, maleic, furmaric, pamoic, cholic, palmitic, mucic, camphoric, glutaric, glycolic, phthalic, tartaric, lauric, stearic, salicyclic, 3-phenylsalicyclic, 5 - phenylsalicyclic, 3 - methylglutaric, orthosulfobenzoic, cyclohexanesulfamic, cyclopentanepropionic, 1-2-cyclohexanedicarboxylic, 4-cyclohexenecarboxylic, octadecenylsuccinic, octenylsuccinic, methanesulfonic, benzenesulfonic, helitanthic, Reinecke's, dimethyldithiocarbamic, sorbic, monochloroacetic, undecylenic, 4' - hydroxyazobenzene - 4 - sulfonic, octadecylsulfuric, picric, benzoic, cinnamic, and like acids.

The new compound of the invention, cirolerosus, has a broad spectrum of antibacterial activity. On the agar disc plate assay using a 13 mm. disc, cirolerosus is active against the following organisms: *Streptococcus lactis, Staphylococcus albus, Bacillus cereus, Sarcina lutea, Lactobacillus casei,* and *Bacillus subtilis*. It also inhibits the growth of KB human epidermoid carcinoma cells in tissue culture. The procedure of Smith et al. (Smith, C. G.; Lummis, W. L., and Grady, J. E.: An improved tissue culture assay. I. Methodology and cytotoxicity of antitumor agents, Cancer Research, 19:843:846, 1959) was used to determine the cytotoxicity of cirolerosus to KB human epidermoid carcinoma cells in tissue culture. KB cell protein synthesis was inhibited 50% ($ID_{50}$) at a concentration of 0.004 mcg./ml.

The new compound of the invention, cirolerosus, is active against *Bacillus subtilis* and can be used to minimize or prevent odor caused by this organism in fish and fish crates. The new compound can be used as a disinfectant on various dental and medical equipment contaminated with *Staphylococcus albus;* it can also be used as a disinfectant on washed and stacked food utensils contaminated with *Staphylococcus albus*. The new compound of the invention is active against *Streptococcus lactis,* which causes the souring of milk, and can be used to prevent or delay souring of dairy products, for example, milk, and cheese. The new compound can also be used to inhibit gram-positive sporeform spreaders on agar plates when isolating molds, yeasts, and streptomycetes.

The new compound of the invention, cirolerosus, gives a red color in acid solution and a blue color in alkaline solution. Accordingly, cirolerosus can be used as a pH indicator.

The following examples are illustrative of the process and products of the present invention but are not to be construed as limiting. All percentages are by weight and all solvent mixture proportions are by volume unless otherwise noted.

*Example 1.—Cirolerosus*

(A) *Fermentation.*—A solid stock of *Streptomyces bellus* var. *cirolerosus,* NRRL 3107, was used to inoculate 500 ml. Erlenmeyer flasks containing 100 ml. of sterile pre-seed medium consisting of the following ingredients:

| | |
|---|---|
| Glucose monohydrate | gm__ 25 |
| Pharmamedia [1] | gm__ 25 |
| Tap water q.s. | liter__ 1 |

[1] Pharmamedia is an industrial grade of cottonseed flour produced by Traders Oil Mill Company, Fort Worth, Tex.

The pre-seed medium pre-sterilization pH was 7.2. The pre-seed inoculum was grown for 2 days at 28° C. on a Gump rotary shaker operating at 260 r.p.m.

The pre-seed inoculum (600 ml.) was used to inoculate a 400 liter seed tank containing 250 liters of the following sterile seed medium:

| | Gm./l. |
|---|---|
| Glucose monohydrate | 10 |
| Corn-steep liquor | 10 |
| Pharmamedia | 2 |
| Wilson's Peptone Liquor No. 159 [1] | 10 |
| Lard oil | 2 |
| Tap water | Balance |

[1] Wilson's Peptone Liquor No. 159 is a preparation of enzymatically hydrolyzed proteins from animal origin.

The pre-sterilization pH of the seed tank medium was 7.2. The seed tank was grown for 24 hours at a temperature of 28° C., with aeration at the rate of 100 liters per minute, and stirring at the rate of 280 r.p.m.

The seed tank, described above, was then used to inoculate a 8,000 liter fermentor containing 5,000 liters of the following sterile medium:

| | Gm./l. |
|---|---|
| Glucose monohydrate | 20 |
| Starch | 20 |
| Suffolk peanut meal [1] | 30 |
| Lard oil | 2 |
| Tap water | Balance |

[1] An industrial grade of peanut meal produced by Suffolk Oil Mill, Inc., Suffolk, Va.

The pH was adjusted to 6.8 with sodium hydroxide before sterilization. The culture was grown for 4 days at a temperature of 28° C. with aeration at the rate of 40 standard cubic feet per minute, and stirring at the rate of 166 r.p.m. Lard oil was added during the fermentation to control foaming.

(B) *Extraction.*—Whole beer from a fermentation as described above, assaying approximately 20 biounits of cirolerosus/ml. with about 3.8% solids, is adjusted to pH 2.0 with sulfuric acid and filtered using 2.5% diatomaceous earth as filter aid. The filtered beer is adjusted to pH 8.5 with 50% sodium hydroxide and extracted 2 times with ⅓ vol. portions of methylene chloride. The methylene chloride extracts are combined and concentrated to ⅓ vol. under reduced pressure. The methylene chloride concentrate is mixed with ⅓ vol. of water, and this mixture is then adjusted to a pH of about 3.5 with sulfuric acid and extracted 2 times with ⅓ vol. portions of water while maintaining the pH of the stirred mixture at about 3.5. The aqueous extracts are combined, adjusted to pH 5.6 with 50% sodium hydroxide, and extracted 2 times with ⅓ vol. portions of methylene chloride. The methylene chloride extracts are combined and concentrated to ¹⁄₂₅ vol. Skellysolve B (isomeric hexanes) is added to the concentrate until a complete precipitation of cirolerosus is accomplished. The red precipitate is then filtered and dried; yield of cirolerosus (ca. 95% pure) is 390 grams assaying 200 biounits/mg. on a *Bacillus subtilis* assay. (The assay is an agar plate assay using Trypticase Soy Broth medium with 30 mcg./ml. of $MnCl_2$. Trypticase is a pancreatic digest of casein. The assay plates are seeded with 0.05 ml. of *B. subtilis* spore suspension per 100 ml. agar and incubated at 30° C. overnight.) A biounit is that amount of antibiotic when dissolved in 0.8 ml. of the test solution and applied to a 12.7 mm. disc gives a 20 mm. zone of inhibition under standard mirobiological conditions. (One microgram of substantially pure cirolerosus assays 0.211 biounit.)

(C) *Purification.*—Cirolerosus, 5.5 grams obtained as above, was dissolved in 500 ml. of a solvent system composed of equal parts of toluene, methylene chloride, and propylene glycol. This solution was placed in tubes 0–24 (10 ml. of each phase per tube) of a counter current distribution apparatus. After 500 transfers, aliquots of the upper and lower phases of every tenth tube were diluted appropriately with methylene chloride and analyzed colorimetrically. The contents of tubes 420 through 470 were pooled, the propylene glycol was removed by washing with water and the toluene-methylene chloride solution was concentrated under reduced pressure. The concentrate was poured into Skellysolve B and the red precipitate of cirolerosus was collected; yield 3.3 gm.

*Example 2.–Cirolerosus hydrochloride*

One gram of cirolerosus, prepared as in Example 1, was dissolved in 80 ml. of acetone. The dark red solution was filtered and 0.16 ml. of concentrated hydrochloric acid was added. The sharp color change from red to light, bright red occurred at about pH 5 and after about 0.14 ml. of hydrochloric acid had been added, after which the pH dropped abruptly to 2. The precipitate of cirolerosus hydrochloride was filtered and dried; yield 865 mg.

*Example 3.–Cirolerosus sulfate*

To a solution of 550 mg. of cirolerosus, prepared as in Example 1, in 50 ml. of absolute ethanol was added 3 drops of 6 N sulfuric acid. The flocculent precipitate which formed was centrifuged from suspension and dissolved in 50 ml. of absolute alcohol with heating. Upon cooling, an amorphous precipitate formed. The addition of 75 ml. of ethyl ether precipitated an additional amount of cirolerosus sulfate which was filtered off and dried; yield 109 mg.

The addition of 2 more drops of 6 N sulfuric acid to the original supernatant followed by ethyl ether gave another 138 mg. of cirolerosus sulfate.

*Example 4.–Cirolerosus picrate*

To 400 mg. of cirolerosus, prepared as in Example 1, in 100 ml. of absolute ethanol was added an ethanolic solution of 100 mg. of picric acid. A dark red precipitate of cirolerosus picrate which formed immediately was filtered and dried.

*Example 5.–Cirolerosus 4′-hydroxyazobenzene-4-sulfonate*

One gram of cirolerosus, prepared as in Example 1, was dissolved in 100 ml. of water with sufficient hydrochloric acid to give a pH of 5.0. A solution of 1.2 gm. of 4′-hydroxyazobenzene-4-sulfonic acid in 100 ml. of water was added, and cirolerosus 4′-hydroxyazobenzene-4-sulfonate separated as a flocculent precipitate. The salt was separated by centrifugation, dissolved in about 200 ml. of 95% ethyl alcohol and reprecipitated by the addition of 350 ml. of ethyl ether. The cirolerosus 4′-hydroxyazobenzene-4-sulfonate was collected by filtration and dried; yield 950 mg.

CHEMICAL AND PHYSICAL PROPERTIES OF CIROLEROSUS

Emprical formula: $C_{45-52}H_{62-76}N_2O_{18}$
Elemental analysis:
    C=60.90, 60.73
    H=7.08, 6.71
    O=28.46
    N=2.80
    C–$CH_3$=6.9%
    N–$CH_3$=7.5%
    Acetyl=9.79%

Specific optical rotation: Too highly colored.
Solubility: Soluble in methanol, ethanol, ethyl acetate, halogenated hydrocarbons, acids, benzene, glycols. Slightly soluble in ether. Relatively insoluble in paraffin hydrocarbons.
Ultraviolet spectrum: The ultraviolet absorption maxima of cirolerosus as reproduced in FIGURE II of the drawing are:

In .01 N acid (alcoholic HCl)—
    236 m$\mu$., a=40.33
    253 m$\mu$., a=23.01 (sh.)
    293 m$\mu$., a=8.08
    465 m$\mu$., a=10.11 (sh.)
    495 m$\mu$., a=12.15
    515 m$\mu$., a=12.63 (sh.)
    525 m$\mu$., a=12.15 (sh.)
    549 m$\mu$., a=5.97 (sh.)
    564 m$\mu$., a=5.23
.01 N base (alcoholic NaOH)—
    242 m$\mu$., a=42.91
    292 m$\mu$., a=7.74
    580 m$\mu$., a=14.32
    610 m$\mu$., a=13.58 (sh.)

Infrared spectrum: The infrared absorption spectrum of cirolerosus suspended in mineral oil mull is reproduced in FIGURE I of the drawings. Cirolerosus shows peaks at the following wave lengths expressed in reciprocal centimeters:

| | |
|---|---|
| 3520 (M) | 1092 (S) |
| 2905 (S) (oil) | 1065 (S) |
| 2770 (S) | 1038 (S) |
| 2720 (M) | 1010 (S) |
| 2660 (M) | 980 (S) |
| 1737 (S) | 960 (S) |
| 1602 (S) | 940 (S) |
| 1578 (S) | 893 (M) |
| 1560 (M) | 900 (M) |
| 1456 (S) (oil) | 883 (M) |
| 1402 (S) | 870 (M) |
| 1377 (S) (oil) | 835 (M) |

| | |
|---|---|
| 1367 (S) | 818 (M) |
| 1299 (S) | 797 (M) |
| 1251 (S) | 771 (M) |
| 1241 (S) | 746 (M) |
| 1224 (S) | 723 (M) |
| 1197 (S) | 712 (M) |
| 1170 (S) | 703 (M) |
| 1115 (S) | 663 (W) |

Band intensities are indicated as S, M, and W, respectively, and are approximated in terms of the backgrounds in the vicinity of the bands. An S band is of the same order of intensity as the strongest in the spectrum; M bands are between ⅓ and ⅔ as intense as the strongest band, and W bands are less than ⅓ as intense as the strongest band. These estimates are made on the basis of a percent transmission scale.

Molecular weight: Molecular weight is 974 ±30 (from eq. wt.).

Titration:

In water—

| | |
|---|---|
| $pKa_1$ | 6.56 |
| $pK'a_2$ | 7.68 |

In dimethyl-formamide—

| | |
|---|---|
| $pK'a_1$ | 7.2 |
| $pK'a_2$ | 8.2 |

We claim:

1. An antibiotic, assaying at least 2.5 mcg./mg. of cirolerosus, a compound which (a) is effective in inhibiting the growth of gram-positive and gram-negative bacteria;

(b) is soluble in methanol, ethanol, ethyl acetate, halogenated hydrocarbons, acids, benzene, glycols; slightly soluble in ether; and relatively insoluble in paraffin hydrocarbons; and in its essentially pure form (c) has the following elemental analysis: C, 60.90, 60.73; H, 7.08, 6.71; O, 28.46; N, 2.80;

(d) has a molecular weight of 974±30 (from eq. wt.);

(e) has a characteristic ultraviolet absorption spectrum as follows:

.01 N acid (alcoholic HCl)—
236 mμ., a=40.33
253 mμ., a=23.01 (sh.)
293 mμ., a=8.08
465 mμ., a=10.11 (sh.)
495 mμ., a=12.15
515 mμ., a=12.63 (sh.)
525 mμ., a=12.15 (sh.)
549 mμ., a=5.97 (sh. )
564 mμ., a=5.23
242 mμ., a=42.91

.01 N base (alcoholic NaOH)—
292 mμ., a=7.74
580 mμ., a=14.32
610 mμ., a=13.58 (sh.);

and as shown in FIGURE II of the drawing; and (f) has a characteristic infrared absorption spectrum as follows:

| | |
|---|---|
| 3520 (M) | 1092 (S) |
| 2905 (S) (oil) | 1065 (S) |
| 2770 (S) | 1038 (S) |
| 2720 (M) | 1010 (S) |
| 2660 (M) | 980 (S) |
| 1737 (S) | 960 (S) |
| 1602 (S) | 940 (S) |
| 1578 (S) | 900 (M) |
| 1560 (M) | 893 (M) |
| 1456 (S) (oil) | 883 (M) |
| 1402 (S) | 870 (M) |
| 1377 (S) (oil) | 835 (M) |
| 1367 (S) | 818 (M) |
| 1299 (S) | 797 (M) |
| 1251 (S) | 771 (M) |
| 1241 (S) | 746 (M) |
| 1224 (S) | 723 (M) |
| 1197 (S) | 712 (M) |
| 1170 (S) | 703 (M) |
| 1115 (S) | 663 (W) | and as shown in FIGURE I of the accompanying drawing.

2. A compound selected from the group consisting of cirolerosus according to claim 1, and the acid addition salts thereof.

3. The hydrochloride of the compound defined in claim 1.

4. The sulfate of the compound defined in claim 1.

5. The pictrate of the compound defined in claim 1.

6. The 4′-hydroxyazobenzene-4-sulfonate of the compound defined in claim 1.

7. A process which comprises cultivating *Streptomyces bellus* var. *cirolerosus* in an aqueous nutrient medium under aerobic conditions until substantial antibiotic activity is imparted to said medium by production of cirolerosus.

8. A process which comprises cultivating *Streptomyces bellus* var. *cirolerosus* under aerobic conditions in an aqueous nutrient medium containing a source of assimilable carbohydrate and assimilable nitrogen until substantial antibiotic activity is imparted to said medium by production of cirolerosus and isolating the cirolerosus so produced.

9. A process according to claim 8 in which the isolation comprises filtering the medium and contacting the filtrate with a water-immiscible solvent for cirolerosus and recovering cirolerosus from the solvent extract.

10. A compound as defined in claim 1, cirolerosus, in its essentially pure form.

References Cited

UNITED STATES PATENTS 3,118,812 1/1964 Gaeumann et al. ---- 167—65

ALBERT T. MEYERS, *Primary Examiner.*

DAREN M. STEPHENS, *Assistant Examiner.*